(12) United States Patent
Yasuda

(10) Patent No.: US 9,126,517 B2
(45) Date of Patent: Sep. 8, 2015

(54) VEHICLE SEAT

(71) Applicant: NHK SPRING CO., LTD., Yokohama-shi (JP)

(72) Inventor: Kenzo Yasuda, Yokohama (JP)

(73) Assignee: NHK SPRING CO., LTD., Yokohama-shi (JP)

(*) Notice: Subject to any disclaimer, the term of this patent is extended or adjusted under 35 U.S.C. 154(b) by 0 days.

(21) Appl. No.: 14/213,522

(22) Filed: Mar. 14, 2014

(65) Prior Publication Data

US 2014/0284987 A1 Sep. 25, 2014

(30) Foreign Application Priority Data

Mar. 22, 2013 (JP) ................................. 2013-060400

(51) Int. Cl.
- *A47C 7/02* (2006.01)
- *A47C 5/12* (2006.01)
- *B60N 2/68* (2006.01)

(52) U.S. Cl.
CPC *B60N 2/68* (2013.01); *B60N 2/686* (2013.01); *A47C 5/12* (2013.01)

(58) Field of Classification Search
CPC .......... B60N 2/68; B60N 2/682; B60N 2/686; B60N 2/688; A47C 5/12

USPC .............. 297/452.18, 452.36, 451.11, DIG. 2
See application file for complete search history.

(56) References Cited

U.S. PATENT DOCUMENTS

| 4,372,609 | A | * | 2/1983 | Boisset | 297/362 |
|---|---|---|---|---|---|
| 6,378,946 | B1 | * | 4/2002 | Cope et al. | 297/452.2 |
| 7,905,550 | B2 | * | 3/2011 | Weber et al. | 297/452.18 |
| 2007/0145224 | A1 | * | 6/2007 | Yamada et al. | 248/429 |
| 2008/0277993 | A1 | * | 11/2008 | Blankart | 297/452.18 |
| 2010/0141009 | A1 | * | 6/2010 | Kirch et al. | 297/452.18 |

FOREIGN PATENT DOCUMENTS

JP 2010-500198 1/2010

* cited by examiner

*Primary Examiner* — Milton Nelson, Jr.
(74) *Attorney, Agent, or Firm* — Knobbe Martens Olson & Bear LLP

(57) ABSTRACT

A vehicle seat includes, at each side portion of a seatback frame, a side frame base portion that forms a side portion of the seatback frame, and that extends in a seat up-and-down direction; an outer side flange portion that is formed at a seat forward side of the side frame base portion, and that is inflected to a seat width direction outer side from the side frame base portion; and an inner side flange portion that is formed at a seat rear side of the side frame base portion, and that is inflected to a seat width direction inner side from the side frame base portion, a corner portion of the inner side flange portion curving in a circular arc shape.

4 Claims, 9 Drawing Sheets

VEHICLE SEAT

CROSS-REFERENCE TO RELATED APPLICATION

This application claims priority under 35 USC 119 from Japanese Patent Application No. 2013-060400 filed Mar. 22, 2013, the disclosure of which is incorporated by reference herein.

BACKGROUND

1. Technical Field

The present invention relates to a seat to be used in a vehicle.

2. Related Art

In Japanese Patent Application National Publication No. 2010-500198, a side frame and a cross-member structuring a seatback frame are integrally formed of resin. In this seatback frame, a cross-sectional shape of the side frame forms a "U" shape whose open side is oriented to a seat width direction outer side.

When the cross-sectional shape of a side frame forms a "U" shape that opens to the seat width direction outer side, as described in Japanese Patent Application National Publication No. 2010-500198, an inflected end portion at the seat rear side thereof serves as an outer edge at the seat rear side of the side frame. Therefore, measures to ensure safety when an occupant sitting on a rear seat collides with the seat rear side outer edge (the inflected end portion) of the side frame are required, such as attaching a protective member such as a cover or the like to the seat rear side inflected end portion, or increasing the thickness of the inflected end portion and curving the outer face thereof into a circular arc shape.

Alternatively, if a side frame is formed with a "U" shape whose open side is oriented to the seat width direction inner side, there is no need to apply the measures mentioned above, because a corner portion of the inflected portion at the seat rear side serves as the seat rear side outer edge. However, there is a possibility of the inflected end portion at the seat forward side of this side frame impeding smooth inertial movement of an occupant sitting on the seat.

SUMMARY

In consideration of the situation described above, the present invention provides a vehicle seat that both allows smooth inertial movement by an occupant sitting on the seat and, with a simple structure, assures safety for an occupant sitting behind the seat.

A vehicle seat according to a first aspect of the present invention includes, at each of two sides of a seatback frame: a side frame base portion that forms a side portion of the seatback frame, and that extends in a seat up-and-down direction; an outer side flange portion that is formed at a seat forward side of the side frame base portion, and that is inflected to a seat width direction outer side from the side frame base portion; and an inner side flange portion that is formed at a seat rear side of the side frame base portion, and that is inflected to a seat width direction inner side from the side frame base portion, a corner portion of the inner side flange portion curving in a circular arc shape.

In the vehicle seat according to the first aspect, the outer side flange portion that is inflected to the seat width direction outer side is formed at the seat forward side of the side frame base portion. Therefore, the end portion of this flange portion does not impede smooth inertial movement of an occupant sitting on the seat, unlike a case in which, for example, a flange portion that is inflected to the seat width direction inner side is formed at the seat forward side of a side frame base portion. Thus, the occupant sitting on the seat may smoothly move by inertia.

Further, because the inner side flange portion that is inflected to the seat width direction inner side is formed at the seat rear side of the side frame base portion, the corner portion of the inner side flange portion that is curved in a circular arc shape (the corner portion of the inflection) serves as a seat rear side outer edge of the side portion. Therefore, the safety of an occupant sitting behind the seat may be assured even if no protective member or the like is attached to the end portion of the inner side flange portion, unlike a case in which, for example, the end portion of a flange portion serves as the seat rear side outer edge of a side portion. Thus, the safety of an occupant sitting behind the seat may be assured with a simple structure: the inner side flange portion being formed at the seat rear side of the side frame base portion and the corner portion of the inner side flange portion being curved in the circular arc shape.

In a vehicle seat according to a second aspect of the present invention, in the vehicle seat of the first aspect, a radius of curvature of the corner portion is greater than a thickness of the inner side flange portion.

In the vehicle seat according to the second aspect, because the radius of curvature of the corner portion of the inner side flange portion is larger than the thickness of the inner side flange portion, the safety of an occupant sitting behind the seat may be further improved.

In a vehicle seat according to a third aspect of the present invention, in the vehicle seat of the first aspect, a portion of the side frame base portion that links the outer side flange portion with the inner side flange portion is elongated and inflected in a crank shape in a seat front-and-rear direction, as viewed in a section orthogonal to the seat up-and-down direction.

In the vehicle seat according to the third aspect, because the portion of the side frame base portion linking the outer side flange portion with the inner side flange portion is elongated and inflected in the crank shape in the seat front-and-rear direction as viewed in the section orthogonal to the seat up-and-down direction, stiffness of the side frame base portion is improved.

In a vehicle seat according to a fourth aspect of the present invention, in the vehicle seat of the first aspect, the seatback frame includes a rear face panel that links the inner side flange portions at the two sides of the seatback frame with one another, and the rear face panel and the side frame base portions are integrally molded.

In the vehicle seat according to the fourth aspect, because the inner side flange portions at the two sides of the seatback frame are linked together by the rear face panel, the stiffness of the seatback frame is improved relative to, for example, a case in which the rear face panel is not provided. Moreover, because the rear face panel is molded integrally with the side frame base portions, a process of fabrication of the seatback frame may be made simpler than in a case in which, for example, the rear face panel and the inner side flange portions are molded separately.

A vehicle seat according to a fifth aspect of the present invention, in the vehicle seat of the fourth aspect, further includes: an upper frame base portion that forms an upper portion of the seatback frame, and that extends in a seat width direction and links the side frame base portions at the two sides of the seatback frame with one another; and a lower side flange portion that is formed at a seat rear side of the upper frame base portion, and that is inflected to a seat lower side, a corner portion of the lower side flange portion curving in a circular arc shape, wherein the lower side flange portion is linked to the rear face panel, and the rear face panel and the upper frame base portion are integrally molded.

In the vehicle seat according to the fifth aspect, because the lower side flange portion that is inflected to the seat lower side is formed at the seat rear side of the upper frame base portion, the corner portion of the lower side flange portion that is curved in a circular arc shape (the corner portion of the inflection) serves as a seat rear side outer edge of the upper portion of the seatback frame. Therefore, the safety of an occupant sitting behind the seat may be assured even if no protective member or the like is attached to the end portion of the flange portion, unlike a case in which, for example, the end portion of a flange portion serves as the seat rear side outer edge. Thus, the safety of an occupant sitting behind the seat may be more certainly assured with a simple structure: the lower side flange portion being formed at the seat rear side of the upper frame base portion and the corner portion of the lower side flange portion being curved in the circular arc shape. Furthermore, because the lower side flange portion is linked to the rear face panel, stiffness of the seatback frame is further improved. Because the rear face panel and the upper frame base portion are molded integrally, a process of fabrication of the seatback frame may be made simpler than in a case in which, for example, the rear face panel and the upper frame base portion are molded separately.

BRIEF DESCRIPTION OF THE DRAWINGS

Exemplary Embodiments of the present invention will be described in detail based on the following figures, wherein.

DETAILED DESCRIPTION

Now, a vehicle seat in accordance with a first exemplary embodiment of the present invention is described.

Figure 1:
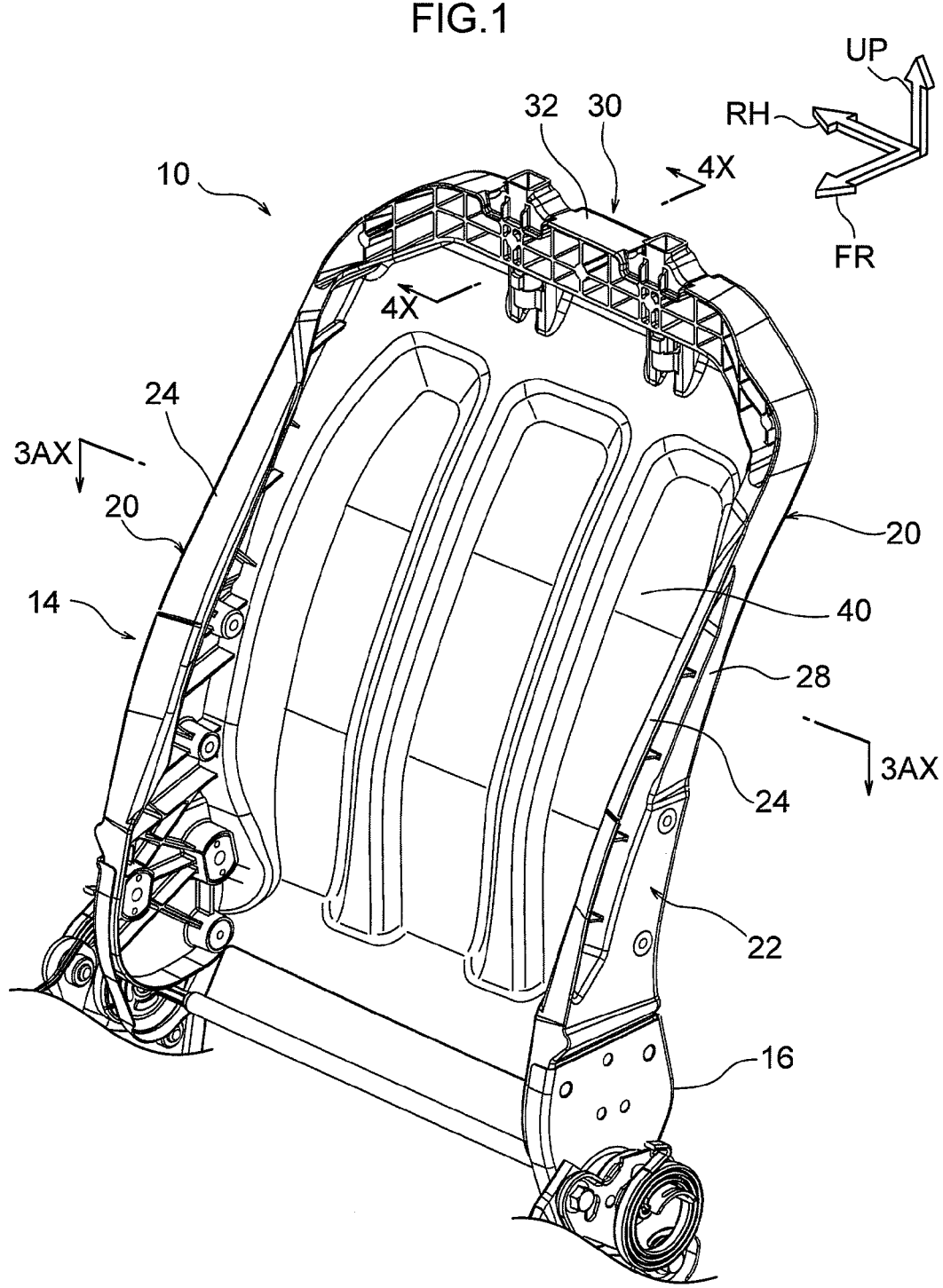
FIG. 1 is a perspective view of a seatback frame in accordance with a first exemplary embodiment, viewed from diagonally forward and left of the seat.

FIG. 1 shows the whole of a seatback frame 14 of a vehicle seat 10 in a perspective view, viewed from forward and diagonally left of the seat. The arrow FR, which is shown where appropriate in the drawings, indicates a forward direction of the seat, the arrow UP indicates a seat upward direction, and the arrow RH indicates a seat rightward direction (one side in a seat width direction).

The structure of the vehicle seat 10 includes a seat cushion frame (not shown in the drawings) and the seatback frame 14. The seat cushion frame constitutes a framework of a seat cushion (not shown in the drawings) on which a vehicle occupant sits. The seatback frame 14 constitutes a framework of a seatback (not shown in the drawings) that supports the back area of the seated occupant. The seat cushion frame is joined to a vehicle body floor (not shown in the drawings) of the vehicle via a conventionally known sliding mechanism (not shown in the drawings).

Figure 2:
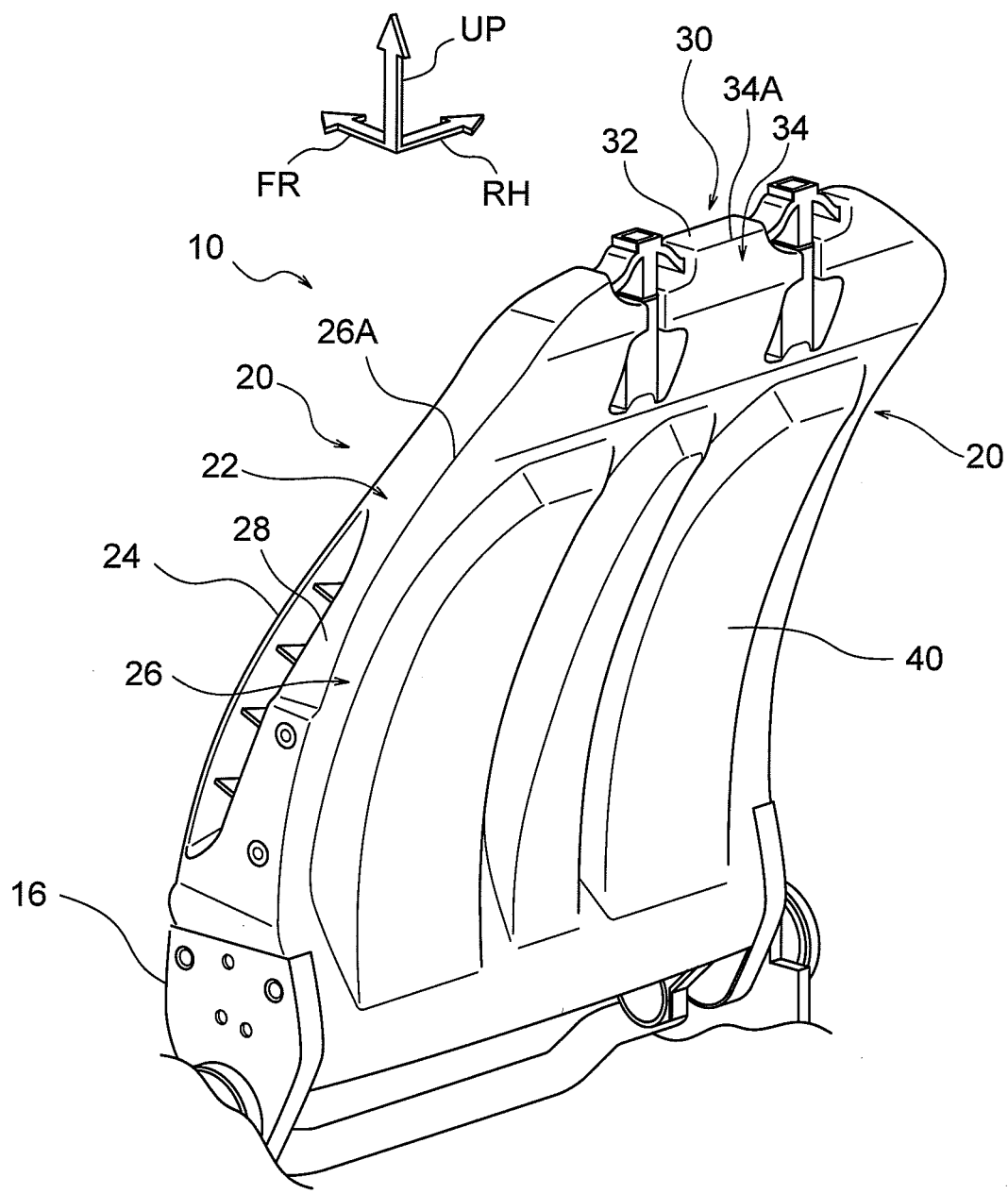
FIG. 2 is a perspective view of the seatback frame in accordance with the first exemplary embodiment, viewed from diagonally rearward and left of the seat.

As shown in FIG. 1 and FIG. 2, the seatback frame 14 is formed of resin, and the structure of the seatback frame 14 includes side portions 20 at both sides in the seat width direction, an upper portion 30 at the seat upper side, and a rear face panel 40 at the seat rear side. The upper portion 30 links end portions at the seat upper side (upper end portions) of the two side portions 20 together. The rear face panel 40 links the two side portions 20 and the upper portion 30. The seatback frame 14 is joined, at seat lower side end portions (lower end portions) of the side portions 20, to a rear side end portion of the seat cushion frame via a conventionally known reclining mechanism 16.

Each side portion 20 includes a side frame base portion 22, an outer side flange portion 24 and an inner side flange portion 26. The side frame base portion 22 extends in the seat up-and-down direction to form a side face of the side portion 20 (which is a side face of the seatback frame 14). The outer side flange portion 24 is formed at the seat forward side of the side frame base portion 22. The inner side flange portion 26 is formed at the seat rear side of the side frame base portion 22.

Figure 3A:
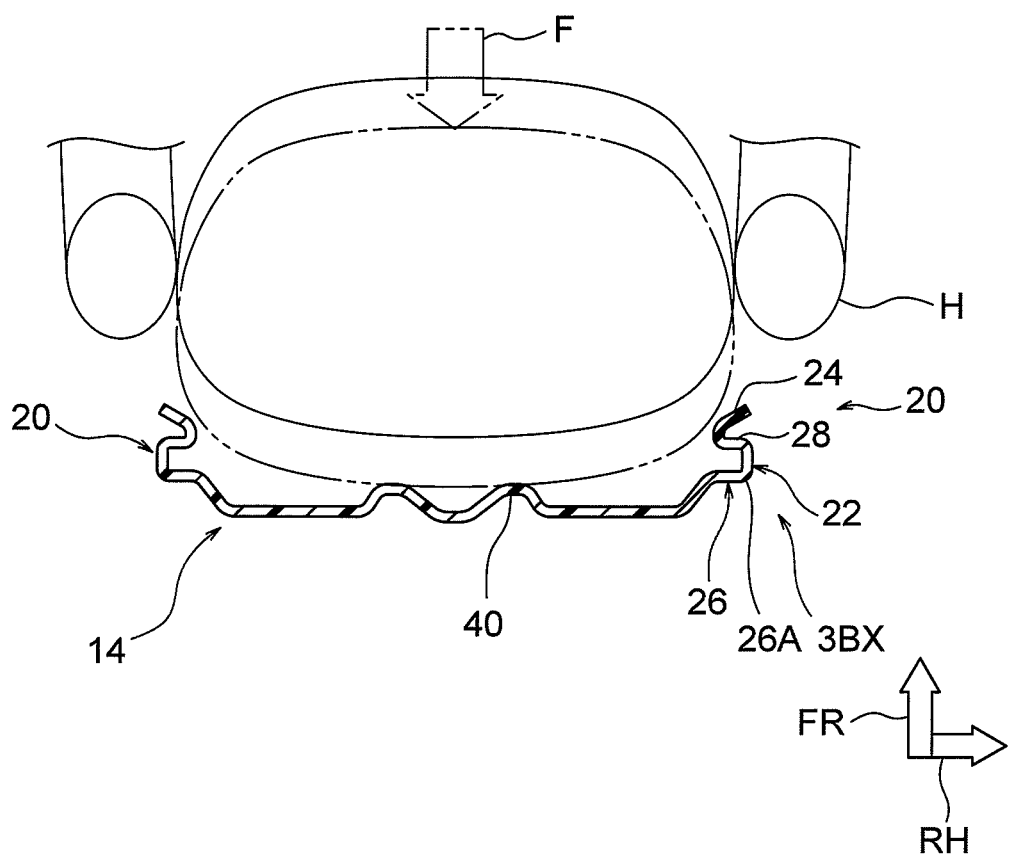
FIG. 3A is a sectional view taken along line 3AX-3AX of FIG. 1.
Figure 3B:
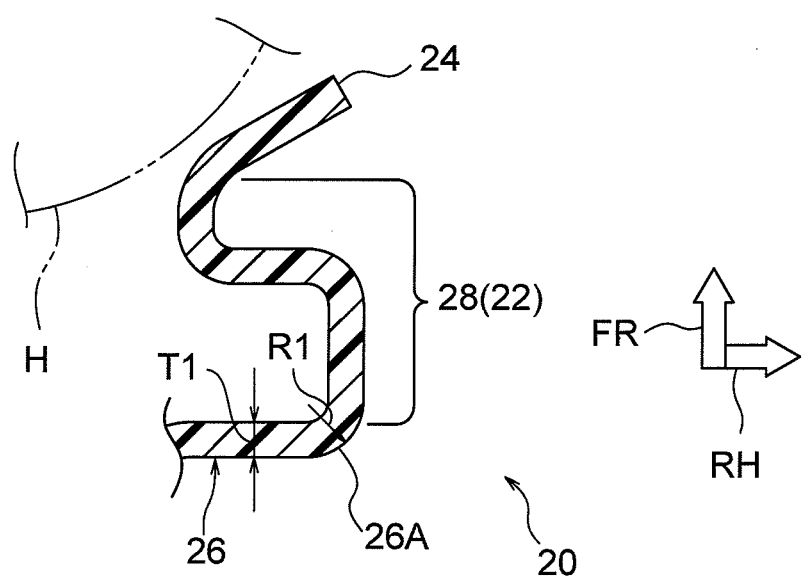
FIG. 3B is a magnified view of the portion indicated by arrow 3BX in FIG. 3A.

As shown in FIG. 3A and FIG. 3B, the outer side flange portion 24 is inflected to the seat width direction outer side from the side frame base portion 22. The outer side flange portion 24 is formed at a seat up-and-down direction middle region of the side frame base portion 22 (see FIG. 1). The term "seat width direction inner side" as used herein refers to the side closer to a seat center in the seat width direction, and the term "seat width direction outer side" refers to the opposite side from the seat width direction inner side (the side further away from the seat width direction center).

As shown in FIG. 3A and FIG. 3B, the inner side flange portion 26 is inflected to the seat width direction inner side from the side frame base portion 22. The inner side flange portion 26 is formed along the whole of the side frame base portion 22 in the seat up-and-down direction (see FIG. 2). As shown in FIG. 3B, a corner portion 26A of the inner side flange portion 26 (the corner portion of the portion that inflects from the side frame base portion 22) is curved in a circular arc shape. A radius of curvature R1 of the corner portion 26A is set to a value greater than a thickness T1 of the inner side flange portion 26. It is preferable if the radius of curvature R1 is specified to be at least 6 mm.

As shown in FIG. 3B, a linking portion 28 of the side frame base portion 22 that links the outer side flange portion 24 to the inner side flange portion 26 is elongated and inflected in a crank shape in the vehicle front-and-rear direction, as viewed in a section orthogonal to the seat up-and-down direction. The present exemplary embodiment is not limited to this structure. For example, this portion may be elongated and inflected in a zig-zag shape in the vehicle front-and-rear direction, or elongated and inflected in a sine wave shape. The linking portion 28 is formed at a portion of the side frame base portion 22 that corresponds with the region in the seat up-and-down direction at which the outer side flange portion 24 is formed.

Figure 4:
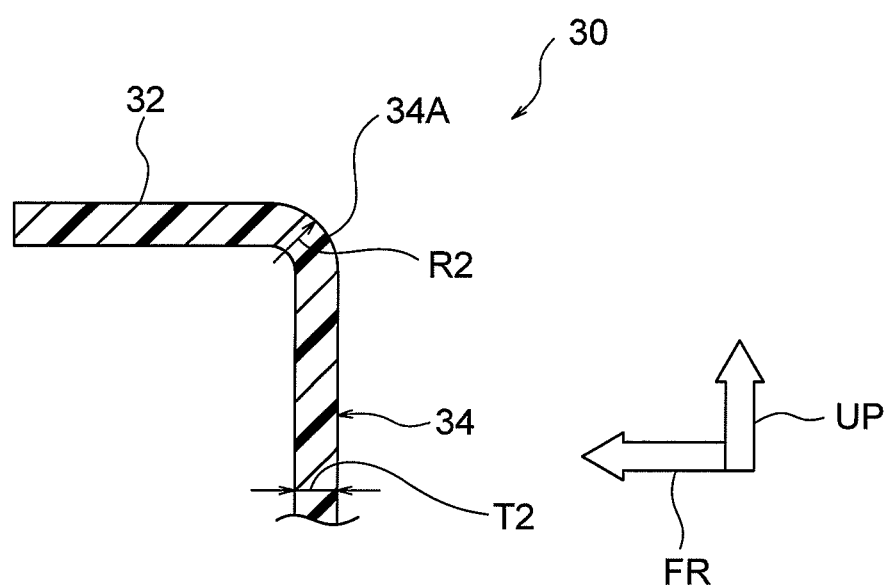
FIG. 4 is a sectional view taken along line 4X-4X of FIG. 1.

As shown in FIG. 1, the upper portion 30 includes an upper frame base portion 32 and a lower side flange portion 34 (see FIG. 4). The upper frame base portion 32 forms an upper face (an upper face of the seatback frame 14), extends in the seat width direction, and links together upper end portions (seat upper side end portions) of the side frame base portions 22 at the two sides. The lower side flange portion 34 is formed at the seat rear side of the upper frame base portion 32.

As shown in FIG. 4, the lower side flange portion 34 is inflected to the seat lower side from the seat rear side of the upper frame base portion 32. The lower side flange portion 34 is formed along the whole of the upper frame base portion 32 in the seat width direction, and is linked to the inner side flange portion 26 of the side frame base portion 22 at each of the two sides. A corner portion 34A of the lower side flange portion 34 (the corner portion of the portion that inflects from the upper frame base portion 32) is curved in a circular arc shape. A radius of curvature R2 of the corner portion 34A is set to a value greater than a thickness T2 of the lower side flange portion 34. It is preferable if the radius of curvature R2 is specified to be at least 6 mm.

The rear face panel 40 links the inner side flange portions 26 at the two sides with one another, and links with the lower side flange portion 34. The rear face panel 40 is molded integrally with the side frame base portions 22 and the upper frame base portion 32. That is, the seatback frame 14 according to the present exemplary embodiment is an integral molded component of resin.

As shown in FIG. 2 and FIG. 3A, a seat width direction middle portion of the rear face panel 40 is elongated in the seat width direction and inflected in an undulating shape as viewed in a section orthogonal to the seat up-and-down direction. The present exemplary embodiment is not limited to this structure. For example, this portion may be elongated and inflected in a zig-zag shape in the seat width direction, or elongated and inflected in a sine wave shape. The seat width direction middle portion of the rear face panel 40 may also be in a flat shape, that is, a structure in which no portion with an undulating shape is formed.

It is acceptable to use a thermosetting resin or a thermoplastic resin as the resin that forms the seatback frame 14. In the present exemplary embodiment, the seatback frame 14 is formed of a nylon resin, but the present invention is not limited by this constitution. For example, resins such as epoxy, polyacetal, polypropylene and unsaturated polyester resins and the like may be used. The seatback frame 14 may be formed of a fiber reinforced plastic (FRP). As a fiber reinforced plastic, for example, a carbon fiber reinforced plastic (CFRP), glass fiber reinforced plastic (GFRP), natural fiber reinforced plastic (reinforced with, for example, bamboo, kenaf or the like) or the like may be used. As the parent material (matrix resin) of a fiber reinforced plastic, one of the resins mentioned above (for example, a resin among nylon, epoxy, polyacetal, polypropylene and unsaturated polyester resins and the like) may be used.

The rear face of the seatback frame 14 according to the present exemplary embodiment (including the rear face of the rear face panel 40 and the rear faces of the inner side flange portions 26) is not covered with a cover material or the like but is instead subjected to a texturing process for decoration.

Now, a process of molding of the seatback frame 14 is described.

Figure 5:
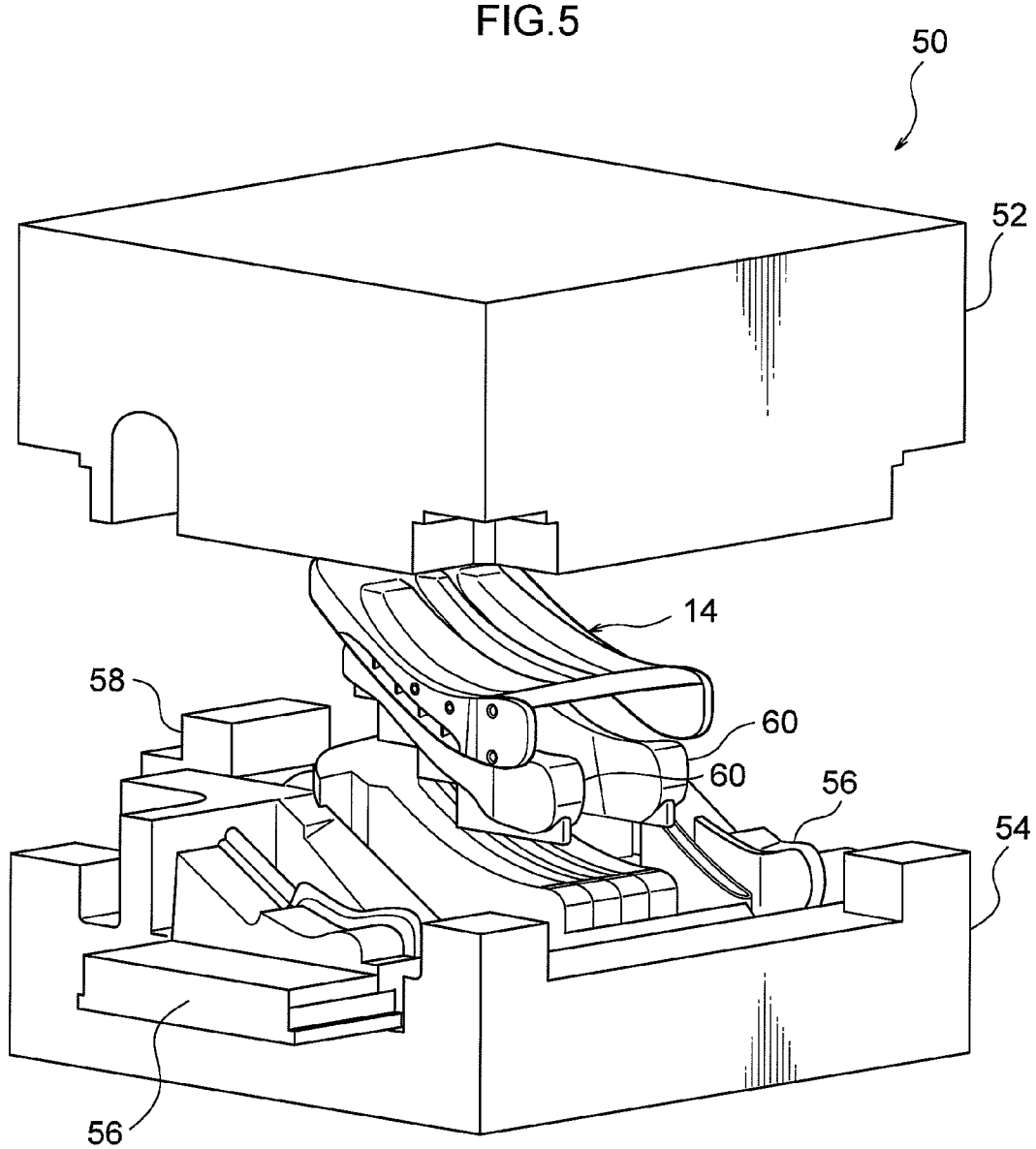
FIG. 5 is a perspective view of a die for molding the seatback frame in accordance with the first exemplary embodiment.

FIG. 5 is a perspective view showing a die 50 that forms a cavity for molding the seatback frame 14. FIG. 6A, FIG. 7A, FIG. 8A and FIG. 9A are lateral sectional diagrams showing the die 50, and FIG. 6B, FIG. 7B, FIG. 8B and FIG. 9B are longitudinal sectional diagrams showing the die 50. The term "lateral sectional diagram" as used herein is intended to mean a diagram that shows a section in which the seatback frame 14 is cut along a direction orthogonal to the seat up-and-down direction (along the seat width direction), and the term "longitudinal sectional diagram" is intended to mean a diagram showing a section in which the seatback frame 14 is cut along the seat up-and-down direction.

The structure of the die 50 includes a movable upper die 52, a fixed lower die 54, a pair of movable sliding dies 56, a movable sliding die 58, and a pair of movable sliding cores 60. The upper die 52 molds the rear face (back face) of the seatback frame 14. The lower die 54 molds the front face of the seatback frame 14. The sliding dies 56 respectively mold the two side faces of the seatback frame 14. The sliding die 58 molds the upper face of the seatback frame 14. The sliding cores 60 mold the inner faces of the side portions 20 of the seatback frame 14.

Figure 6A:
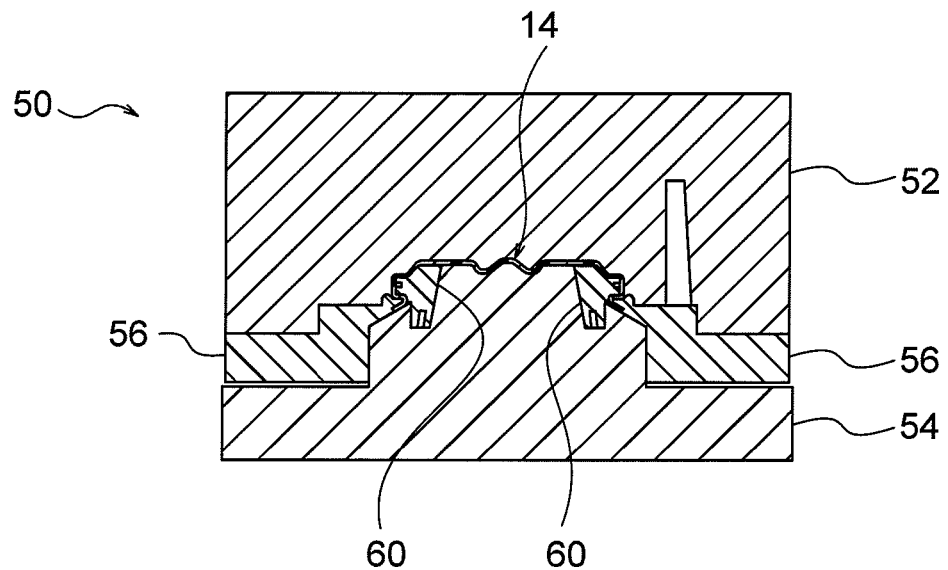
FIG. 6A is a lateral sectional view of the die after molding of the seatback frame.
Figure 6B:
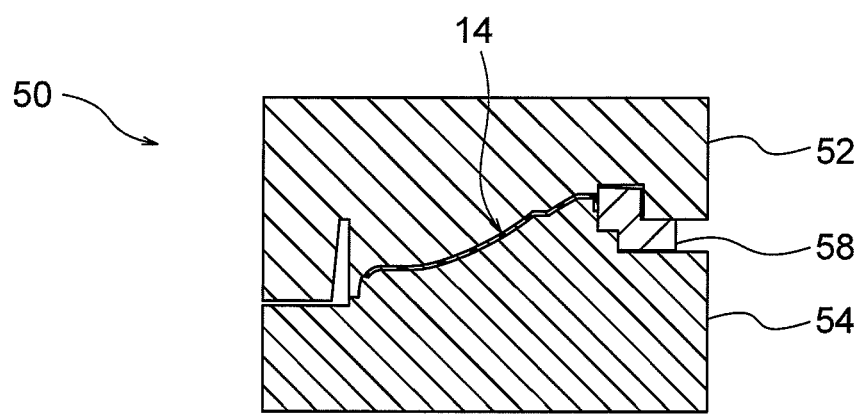
FIG. 6B is a longitudinal sectional view of the die after the molding of the seatback frame.
Figure 7A:
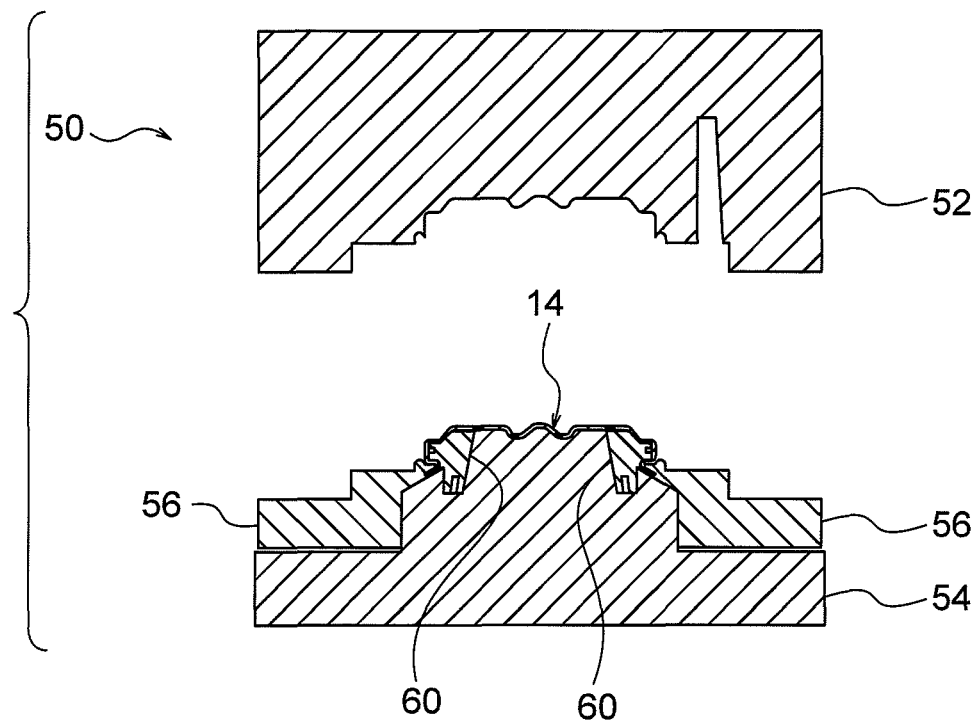
FIG. 7A is a lateral sectional view of the die when an upper die is opened.
Figure 7B:
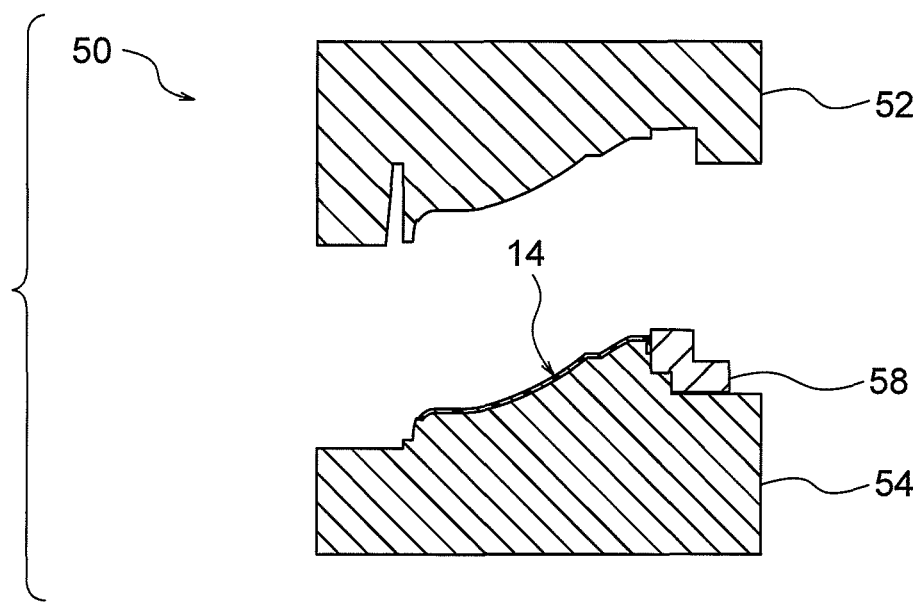
FIG. 7B is a longitudinal sectional view of the die when the upper die is opened.

As shown in FIG. 6A and FIG. 6B, in the state in which the die 50 is closed, molten resin is injection-molded in the cavity that is for molding the seatback frame 14 and is hardened. Thus, the seatback frame 14 is molded. Then, as shown in FIG. 7A and FIG. 7B, the upper die 52 is moved to open up the die 50, and the rear face of the seatback frame 14 is exposed.

Figure 8A:
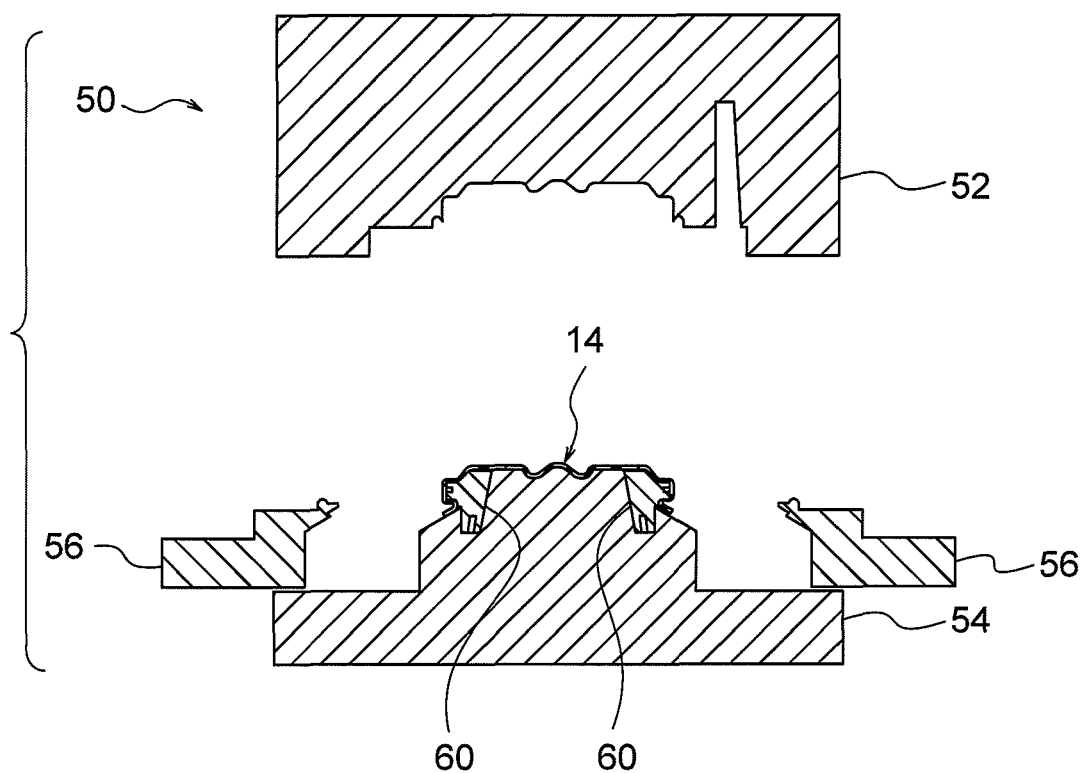
FIG. 8A is a lateral sectional view of the die when sliding dies are opened.
Figure 8B:
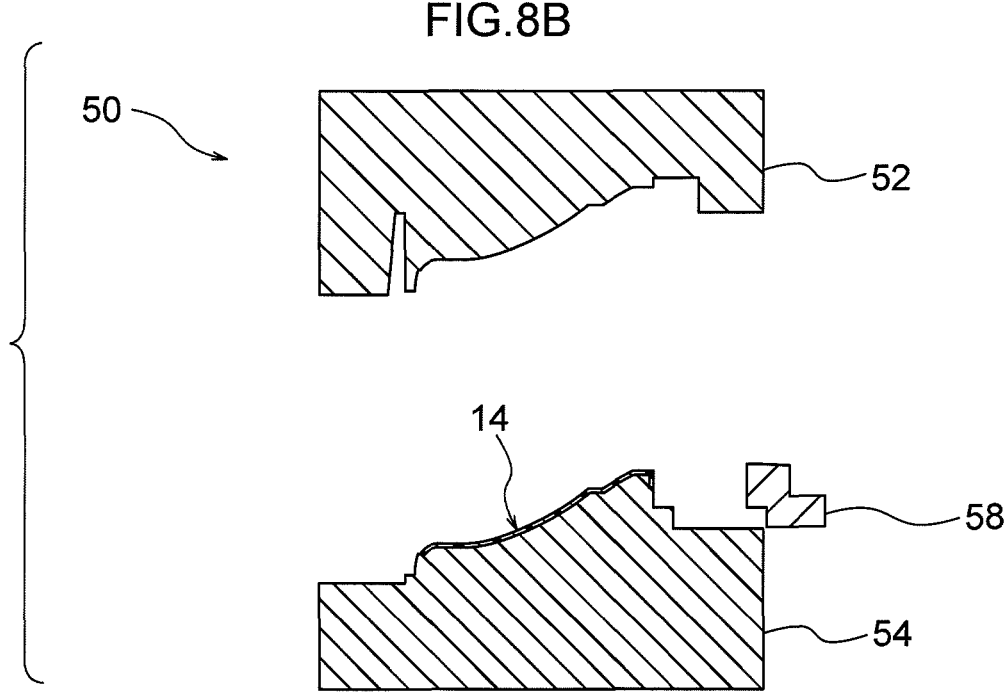
FIG. 8B is a longitudinal sectional view of the die when the sliding dies are opened.
Figure 9A:
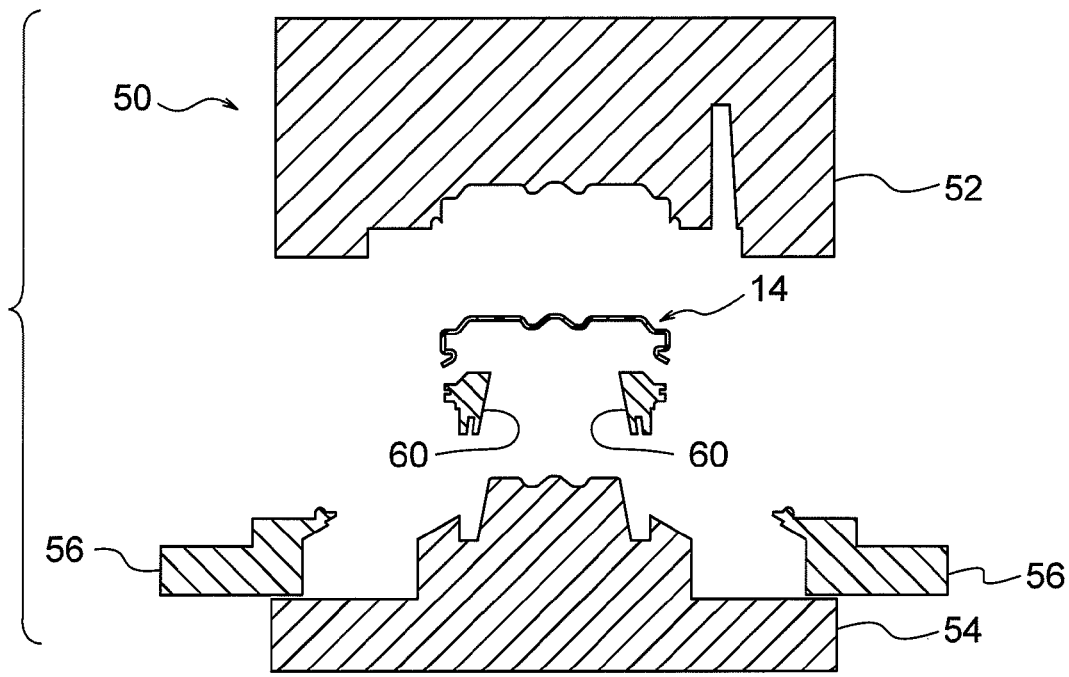
FIG. 9A is a lateral sectional view of the die after the seatback frame has been separated from a lower die.
Figure 9B:
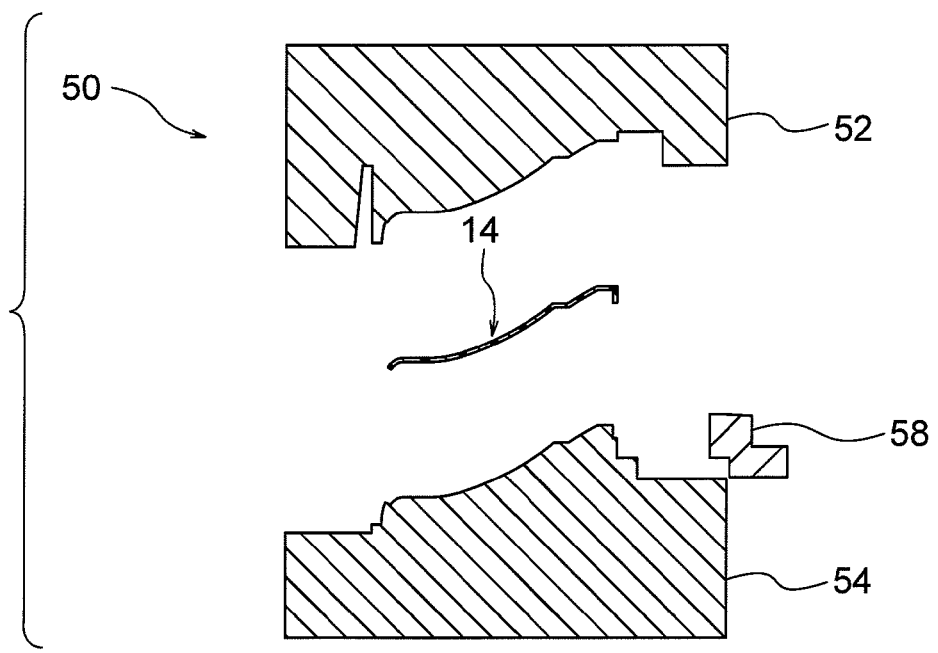
FIG. 9B is a longitudinal sectional view of the die after the seatback frame has been separated from the lower die.

Next, as shown in FIG. 8A and FIG. 8B, the pair of sliding dies 56 and the sliding die 58 are each moved, and the side faces and upper face of the seatback frame 14 are exposed. Then, as shown in FIG. 9A and FIG. 9B, the pair of sliding cores 60 are each moved and the seatback frame 14 is released from the lower die 54. Thus, the inner faces of the seatback frame 14 are exposed and the inner faces of the side portions 20 of the seatback frame 14 are exposed. Thus, the seatback frame 14 is separated from the die 50.

Now, operation and effects of the vehicle seat 10 of the present exemplary embodiment are described.

In the vehicle seat 10, the outer side flange portions 24 that are inflected to the seat width direction outer sides are formed at the seat forward sides of the side frame base portions 22. Therefore, when, for example, a rear end collision occurs, inertial movement of an occupant H (movement subject to an inertial force F) is not impeded by the end portions of the outer side flange portions 24. That is, because the outer side flange portions 24 are formed at the seat forward sides of the side frame base portions 22, the seated occupant H may smoothly move by inertia.

Meanwhile, because the inner side flange portions 26 that are inflected to the seat width direction inner sides are formed at the seat rear sides of the side frame base portions 22, the corner portions 26A of the inner side flange portions 26 that are curved in circular arc shapes serve as seat rear side outer edges of the side portions 20. Therefore, when, for example, a front end collision occurs and an occupant sitting behind the seat collides with the seat rear side outer edge of the seatback frame 14 due to inertial movement, safety may be assured. That is, the safety of an occupant sitting behind the seat may be assured with a simple structure: the inner side flange portions 26 being formed at the seat rear sides of the side frame base portions 22 and the corner portions 26A of the inner side flange portions 26 being curved in circular arc shapes.

In particular, because the radius of curvature R1 of the corner portion 26A of each inner side flange portion 26 is made larger than the thickness T1 of the inner side flange portion 26, the safety of an occupant sitting behind the seat may be further improved.

Because, as viewed in a section of the vehicle seat 10 orthogonal to the seat up-and-down direction, the linking portion 28 linking the outer side flange portion 24 and inner side flange portion 26 of each side frame base portion 22 is elongated and inflected in a crank shape in the seat front-and-rear direction, stiffness of the side frame base portion 22 is improved.

Further, because the lower side flange portion 34 that is inflected to the seat lower side is formed at the seat rear side of the upper frame base portion 32 of the vehicle seat 10, the corner portion 34A of the lower side flange portion 34 that is curved in a circular arc shape serves as the seat rear side outer edge of the upper portion 30. Therefore, when, for example, a front end collision occurs and an occupant sitting behind the seat collides with the seat rear side outer edge of the seatback frame 14 due to inertial movement, safety may be assured. That is, the safety of an occupant sitting behind the seat may be more certainly assured with a simple structure: the lower side flange portion 34 being formed at the seat lower side of the upper frame base portion 32 and the corner portion 34A of the lower side flange portion 34 being curved in a circular arc shape.

In particular, because the radius of curvature R2 of the corner portion 34A of the lower side flange portion 34 is made larger than the thickness T2 of the lower side flange portion 34, the safety of an occupant sitting behind the seat may be further improved.

Because the inner side flange portions 26 at the two sides of the vehicle seat 10 are linked to one another by the rear face panel 40, stiffness of the seatback frame 14 is improved, and because the rear face panel 40 and the lower side flange portion 34 are linked, stiffness of the seatback frame 14 is even further improved.

Because the seatback frame 14 is an integral molded component in which the rear face panel 40, the side frame base portions 22 and the upper frame base portion 32 are integrally molded, the process of fabrication may be simplified.

Because the rear face of the seatback frame 14 is not covered with a cover material or the like but a texturing process is applied, design appearance may be improved while costs are lowered and weight reduced by the omission of the cover material. The texturing process may be applied to the side faces (the surfaces of the side frame base portions 22) as well as the rear face of the seatback frame 14. Instead of a texturing process being applied to the rear face of the seatback frame 14, a thin film with a design appearance (on which a pattern with a design is depicted) may be adhered to the rear face.

In the present exemplary embodiment, the texturing process is applied to the rear face of the seatback frame 14, but the present invention is not limited to this configuration. If the surface appearance of visible surfaces of the molded seatback frame 14 is favorable, the rear face and side faces of the seatback frame 14 may serve as visible design surfaces without decoration. Molding methods that can improve the appearance of visible surfaces of the seatback frame 14 include, for example, foam-molding with a core back, molding with thermal cycling, and the like.

In the first exemplary embodiment, the seatback frame 14 is provided with the rear face panel 40, but the present invention is not limited to this configuration. For example, instead of the seatback frame 14 being provided with the rear face panel 40, a structure in which the side portions 20 are reinforced by cross-members is possible.

In the foregoing, an exemplary embodiment of the present invention has been illustrated and the exemplary embodiment has been described. However, this embodiment is an example and numerous modifications may be embodied within a scope not departing from the spirit of the invention. It will be clear that the technical scope of the present invention is not to be limited by this exemplary embodiment.

What is claimed is:

1. A vehicle seat comprising at each of two sides of a seatback frame:
   a side frame base portion that forms a side portion of the seatback frame, and that extends in a seat up-and-down direction, wherein said side frame base portion is configured to be at an outermost end of the seatback frame in a seat width direction and formed of resin;
   an outer side flange portion that is formed at a seat forward side of the side frame base portion, and that is inflected to the seat width direction outer side from the side frame base portion;
   an inner side flange portion that is formed at a seat rear side of the side frame base portion, and that is inflected to a seat width direction inner side from the side frame base portion, a corner portion of the inner side flange portion curving in a circular arc shape;
   a rear face panel that links the inner side flange portions at the two sides of the seatback frame with one another, and the rear face panel and the side frame base portions are integrally molded;
   an upper frame base portion that forms an upper portion of the seatback frame, and that extends in a seat width direction and links the side frame base portions at the two sides of the seatback frame with one another; and
   a lower side flange portion that is formed at a seat rear side of the upper frame base portion, and that is inflected to a seat lower side, a corner portion of the lower side flange portion curving in a circular arc shape,
   wherein the lower side flange portion is linked to the rear face panel, and the rear face panel and the upper frame base portion are integrally molded.

2. The vehicle seat according to claim 1, wherein a radius of curvature of the corner portion is greater than a thickness of the inner side flange portion.

3. The vehicle seat according to claim 1, wherein a portion of the side frame base portion that links the outer side flange portion with the inner side flange portion is elongated and inflected in a crank shape in a seat front-and-rear direction, as viewed in a section orthogonal to the seat up-and-down direction.

4. A vehicle seat comprising at each of two sides of a seatback frame:
   a side frame base portion that forms a side portion of the seatback frame, and that extends in a seat up-and-down direction;
   an outer side flange portion that is formed at a seat forward side of the side frame base portion, and that is inflected to the seat width direction outer side from the side frame base portion;
   an inner side flange portion that is formed at a seat rear side of the side frame base portion, and that is inflected to a seat width direction inner side from the side frame base portion, a corner portion of the inner side flange portion curving in a circular arc shape;
   a rear face panel that links the inner side flange portions at the two sides of the seatback frame with one another, and wherein the rear face panel and the side frame base portions are integrally molded;

an upper frame base portion that forms an upper portion of the seatback frame, and that extends in a seat width direction and links the side frame base portions at the two sides of the seatback frame with one another; and
a lower side flange portion that is formed at a seat rear side of the upper frame base portion, and that is inflected to a seat lower side, a corner portion of the lower side flange portion curving in a circular arc shape,
wherein the lower side flange portion is linked to the rear face panel, and the rear face panel and the upper frame base portion are integrally molded.

\* \* \* \* \*